June 4, 1963 P. W. GAENSSLE 3,092,212
RAILWAY DISK BRAKES
Filed Feb. 13, 1961 2 Sheets-Sheet 1

INVENTOR.
Paul W. Gaenssle
BY Wm. R. Glisson
ATTORNEY

June 4, 1963 P. W. GAENSSLE 3,092,212
RAILWAY DISK BRAKES
Filed Feb. 13, 1961 2 Sheets-Sheet 2

INVENTOR.
Paul W. Gaenssle
BY Wm. R. Glisson
ATTORNEY

United States Patent Office 3,092,212
Patented June 4, 1963

3,092,212
RAILWAY DISK BRAKES
Paul W. Gaenssle, Abington, Pa., assignor to The Budd Company, Philadelphia, Pa., a corporation of Pennsylvania
Filed Feb. 13, 1961, Ser. No. 88,746
2 Claims. (Cl. 188—59)

This invention relates to railway disk brakes and has for an object the provision of improvements in this art.

One of the particular objects of the invention is to provide a simple, reliable and efficient brake operating assembly.

Another object is to provide a connected operating mechanism for two brake mechanisms operated by two power devices.

Another object is to provide a common yoke device adapted to be operated conjointly by the power devices and alone by a hand brake operator.

The above and other objects and advantages of the invention will be apparent from the following description of an exemplary embodiment, reference being made to the accompanying drawings wherein.

Figure 1:
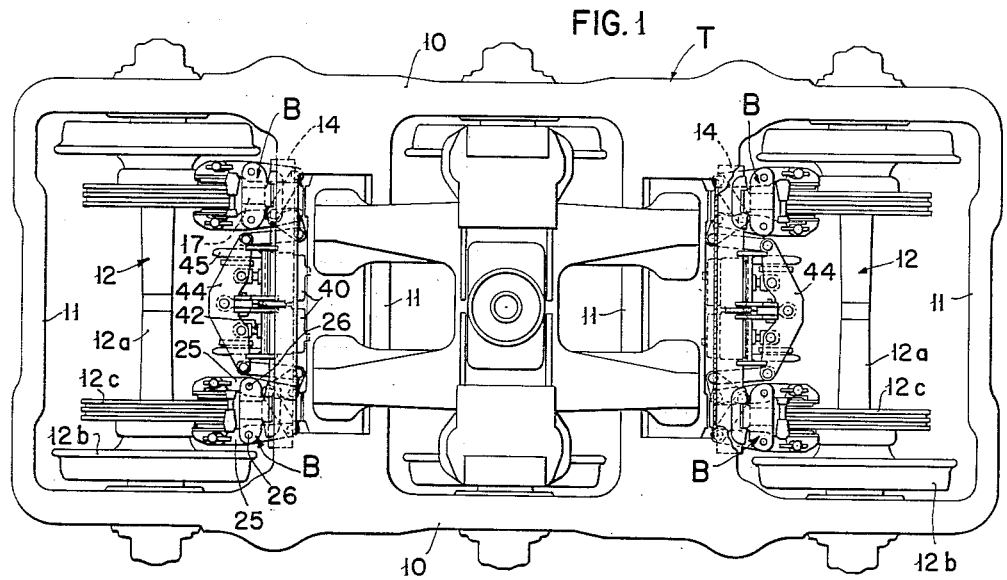
FIG. 1 is a top plan view of a truck having brakes embodying the invention.
Figure 2:
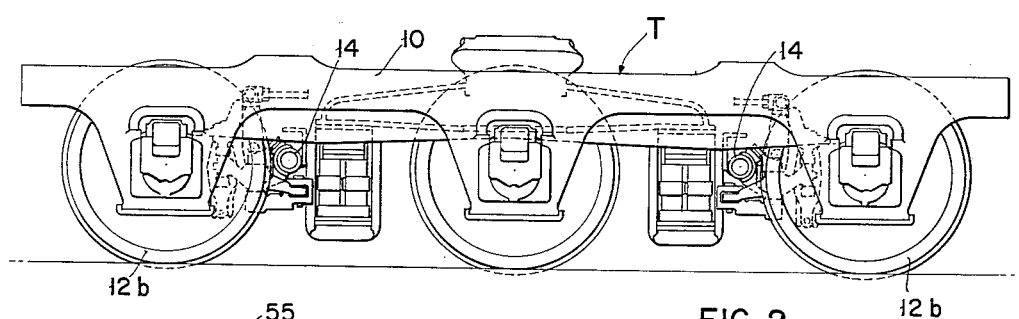
FIG. 2 is a side elevation.
Figure 6:
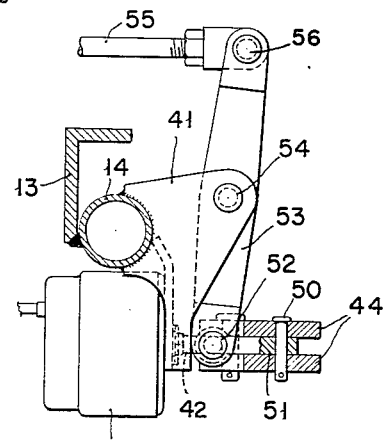
FIG. 6 is a vertical section taken on the line 6—6 of FIG. 3.
Figure 3:
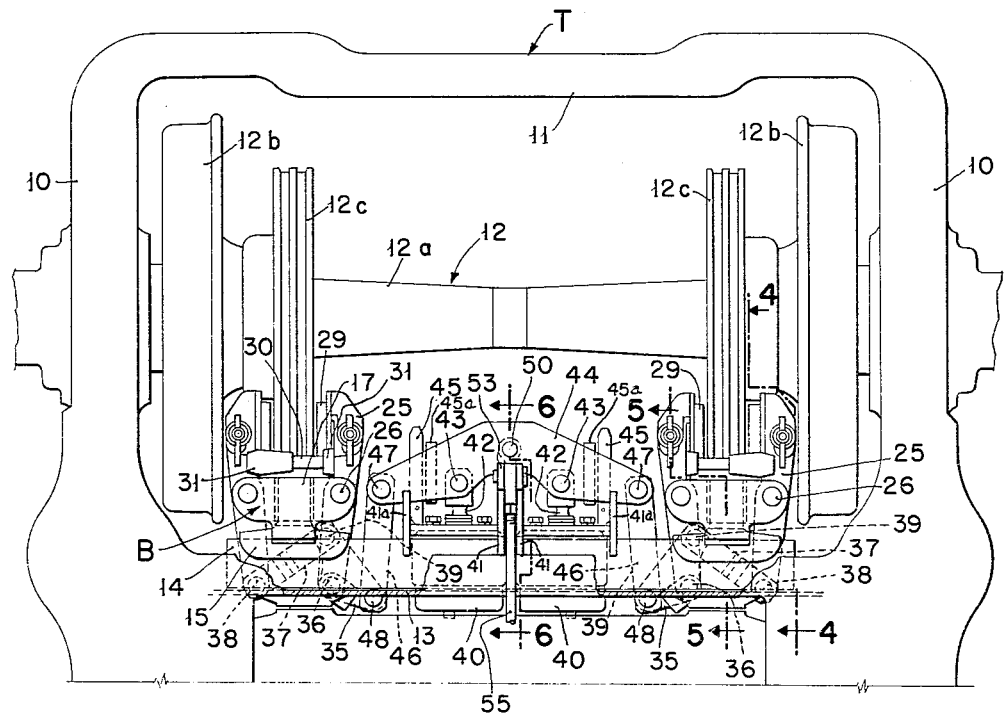
FIG. 3 is a partial enlarged plan view.
Figures 4, 5:
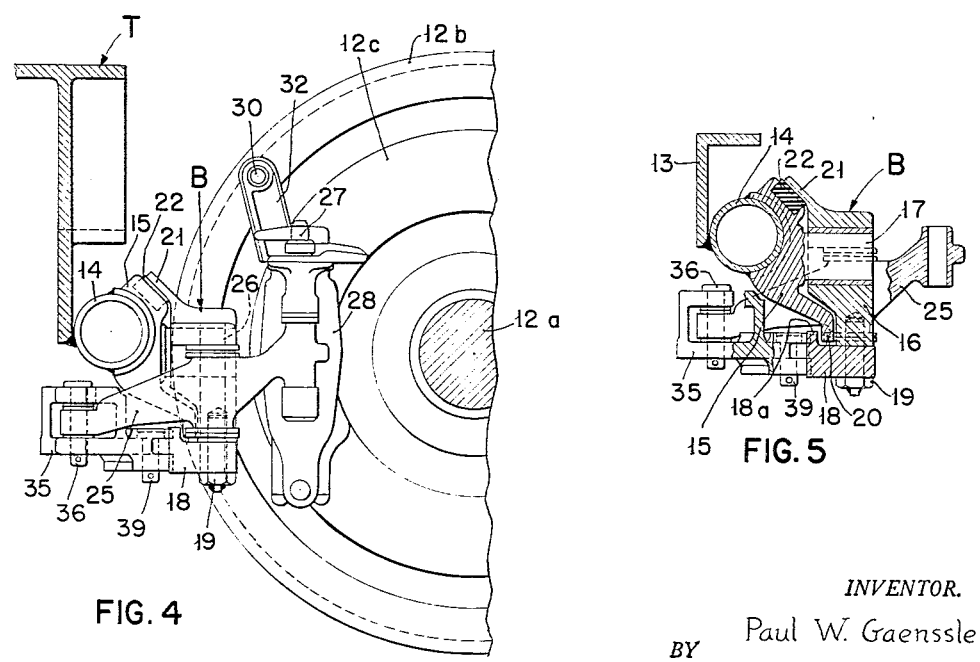
FIG. 4 is a vertical section taken on the line 4—4 of FIG. 3.
FIG. 5 is a vertical section taken on the line 5—5 of FIG. 3.

The truck frame T comprises side frames 10 and transverse members 11. Each of two end wheel-axle units 12 includes an axle 12a, wheels 12b and brake disks 12c. On brackets 13 secured beneath a transverse member 11 there is secured a brake mounting or supporting beam 14.

On brackets 15 which are welded on the brake support beam there are mounted brake operating assemblies B. Specifically, a brake frame 16 is mounted for oscillation about the axis of a horizontal longitudinally extending journal 17 carried by the bracket 15. The frame 16 is provided with a retainer 18 held thereon by cap bolts 19, the retainer having a flange 18a overlapping an arcuate flange 20 formed on the bracket 15 when secured to the frame. Arm 21 and rubber bumper 22 limit the turning movement of the frame.

Brake tong levers 25 are mounted on pivot pins 26 on the frame 16 and at their forward ends, on pivot pins 27, carry brake shoes 28 having lining pads 29 operating against the side faces of the disk. A guide pin 30 between guides 31 on shoe extensions 32 keep the shoes in alignment.

A bell crank lever 35 is pivoted by a pin 36 to the inner one of the tong levers and a link 37 is pivoted by a pin 38 to the other tong lever and by a pin 39 to one arm of the bell crank lever. The bell crank lever and link form the immediate operating gear for the brake tong levers.

Two power devices 40 have their cylinders secured by brackets 41 to the brake beam 14; and the rods 42 of the power devices are connected by pivot pins 43 to an equalizer brake operating yoke beam 44 movable along guide supports 45. The guide supports 45 are secured by brackets 41a to the brake beam 14 and the yoke beam is provided with guide bars 45a holding it in alignment with the guide supports 45. The yoke comprises two vertically spaced plates. At its outer ends the yoke beam is connected by links 46 to the bell crank levers 35, pivot pins 47 connecting one end of the links to the yoke beam and pivot pins 48 connecting the other end of the links to the bell crank levers.

At the center the yoke beam 4 is connected by a pivot pin 50 to a link 51 which at its other end is connected by a ball joint 52 to a vertical hand brake lever 53 pivoted by a pin 54 to the inner ones of the brackets 41.

The upper end of the lever 53 has pivotally connected thereto as by a pivot pin 56, a pull link 55 which is operated by suitable means on the truck, not shown herein.

When the brakes are operated normally the yoke beam 44 is moved conjointly by the two power devices 40 and through the connecting linkages at its ends the beam operates both brake operating mechanisms. Specifically when the power rods 42 move out they move the beam 44 out. This moves the links 46 out (toward the axle 12a) to turn the bell crank levers 35 about their fulcrum pins 36 carried by the ends of inboard tong levers 25. The bell crank levers through their other pivot pins 39, links 37 and pivot pins 38 move the outboard tong levers 25 to apply the shoes and this causes the inboard tong levers to apply their shoes. If one power device fails to operate the active power device will still carry all parts to braking position because the brake engagement causes all parts to move; but in this case the brakes nearer the active power device will be applied more strongly than the brakes which are more distant from the active power device. When the brakes are operated by hand or otherwise for emergency the link 55 is pulled and this, acting at the center of the brake yoke beam, moves it and thereby operates the brake mechanisms.

It is seen that the invention provides simple and dependable paired brake operating means which is operated by paired power means or by a single outside power application. The linkages for operating the brakes cause them to be applied in an even equalized manner.

While one embodiment of the invention has been described for purposes of illustration it is to be understood that there may be various embodiments and modifications within the general scope of the invention.

What is claimed is:

1. In a disk brake for a railway truck having a plurality of axles each supported by a pair of wheels, and a truck frame, the combination of:

a pair of transversely-spaced brake disks adapted to be mounted on one of said axles;

an elongated, brake support beam adapted to be rigidly secured at its ends to said truck frame whereby said brake support beam extends parallel to said one axle at substantially the same height;

a pair of transversely-spaced brake units each mounted on said brake support beam adjacent to a different one of said brake disks, each of said brake units comprising a pair of brake shoes each disposed on a different side of the associated brake disk, a pair of medially-pivoted, transversely-spaced, longitudinally-extending brake tong levers each pivotally connected at one end to a different one of said brake shoes and having its other end extending beneath said brake support beam, a horizontal, longitudinal journal operatively connected to said brake support beam, a brake frame mounted on said journal for limited pivotal movement about the axis thereof, said brake tong levers being medially pivoted on said brake frame, a bell crank pivotally mounted on said other end of the inboard brake tong lever, and a link pivotally connected at its ends to one end of said bell crank and said other end of the outboard brake tong lever for actuating said brake tong levers in response to actuation of said bell crank;

a transversely-extending, longitudinally-reciprocal, equalizer yoke beam disposed between said brake support beam and said one axle and having its ends spaced longitudinally from the other ends of said bell cranks, said yoke beam being movable between an inoperative position and an operative position wherein said yoke beam is closer to said one axle than when it is in its inoperative position;

a pair of longitudinal links connected at their ends to the ends of said yoke beam and to the other ends of said bell cranks for operating said bell cranks in response to movement of said yoke beam between said positions so that the brakes are applied and released upon movement of said yoke beam into and from its operative position;

a pair of pneumatically actuated, transversely-spaced brake cylinder actuators mounted beneath said brake support beam on opposite sides of the longitudinal center line of the truck, each of said actuators comprising a longitudinal actuating rod connected at its free end to said yoke beam at a point spaced from the center of said yoke beam, said actuating rod being operative to move said yoke beam in response to operation of each actuator whereby actuation thereof moves said yoke beam to its operative position and a hand brake operator lever medially pivoted for pivotal movement in a vertical plane that contains the longitudinal center line of the truck, said hand brake operator lever having one end connected to the center of said yoke beam for actuating it upon actuation of said hand brake operator lever.

2. A disk brake in accordance with claim 1 and including horizontal, longitudinally-extending guide supports carried by said brake support beam and supporting said yoke beam for sliding movement between said positions.

References Cited in the file of this patent

UNITED STATES PATENTS

| | | |
|---|---|---|
| 2,236,898 | Eksergian | Apr. 1, 1941 |
| 2,284,605 | Eksergian | May 26, 1942 |
| 2,415,388 | Horton | Feb. 4, 1947 |
| 2,885,034 | Holin | May 5, 1959 |
| 2,947,384 | Busch | Aug. 2, 1960 |